(12) United States Patent
Huo et al.

(10) Patent No.: US 10,962,788 B2
(45) Date of Patent: *Mar. 30, 2021

(54) HEAD-MOUNTED DEVICE WITH ACTIVE OPTICAL FOVEATION

(71) Applicant: Apple Inc., Cupertino, CA (US)

(72) Inventors: Edward S. Huo, Sunnyvale, CA (US); David A. Schmuck, Mountain View, CA (US); Jason C. Sauers, Sunnyvale, CA (US); Kevin A. Gross, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,306

(22) Filed: Mar. 26, 2020

(65) Prior Publication Data

US 2020/0225489 A1   Jul. 16, 2020

Related U.S. Application Data

(63) Continuation of application No. 16/130,775, filed on Sep. 13, 2018, now Pat. No. 10,642,049.

(Continued)

(51) Int. Cl.
*G02B 27/01* (2006.01)
*G06F 3/01* (2006.01)
(Continued)

(52) U.S. Cl.
CPC ..... *G02B 27/0172* (2013.01); *G02B 26/0825* (2013.01); *G02B 27/0176* (2013.01);
(Continued)

(58) Field of Classification Search
CPC . G06F 3/013; G06F 3/011; G02B 2027/0138; G02B 2027/0187;
(Continued)

(56) References Cited

U.S. PATENT DOCUMENTS 4,782,399 A   11/1988   Sato
6,005,682 A   12/1999   Wu et al.
(Continued)

FOREIGN PATENT DOCUMENTS

CN   1499238 A   5/2004
CN   104055478 A   9/2014
(Continued)

*Primary Examiner* — Sanjiv D. Patel
(74) *Attorney, Agent, or Firm* — Treyz Law Group, P.C.; Joseph F. Guihan

(57) ABSTRACT

A pass-through camera in a head-mounted device may capture image data for displaying on a display in the head-mounted device. However, only low-resolution image data may be needed to display low-resolution images in the periphery of the user's field of view on the display. Therefore, the pass-through camera may only capture high-resolution images that correspond to the portion of the user's field-of-view that is being directly viewed and may capture lower resolution image data that corresponds to the real-world objects in the user's peripheral vision. To enable the camera module to selectively capture high-resolution images, the pass-through camera may include an image sensor with two or more pixel densities, a distortion lens, and/or one or more planar or curved mirrors. Any of the components in the camera module may be adjusted to change which portion of a scene is captured with high-resolution image data.

12 Claims, 18 Drawing Sheets

Related U.S. Application Data

(60) Provisional application No. 62/662,410, filed on Apr. 25, 2018.

(51) Int. Cl.
*H04N 5/225* (2006.01)
*G02B 27/10* (2006.01)
*H04N 5/232* (2006.01)
*G02B 26/08* (2006.01)

(52) U.S. Cl.
CPC .............. *G02B 27/10* (2013.01); *G06F 3/013* (2013.01); *H04N 5/2253* (2013.01); *H04N 5/23232* (2013.01); *G02B 2027/0138* (2013.01)

(58) Field of Classification Search
CPC ............ G02B 27/0093; G02B 27/0172; G02B 2027/0174; G02B 2027/0181; G02B 26/105; G02B 27/0103; G02B 27/0176; G02B 27/028; G02B 27/104; G06K 7/10722; H04N 13/344; H04N 13/383; H04N 5/23287
See application file for complete search history.

(56) References Cited

U.S. PATENT DOCUMENTS

| | | |
|---|---|---|
| 6,320,618 B1 | 11/2001 | Aoyama |
| 8,988,564 B2 | 3/2015 | Webster et al. |
| 2007/0008634 A1 | 1/2007 | Chiu |
| 2007/0109667 A1 | 5/2007 | Chiu |
| 2007/0258158 A1 | 11/2007 | Aoki et al. |
| 2008/0111881 A1 | 5/2008 | Gibbs et al. |
| 2008/0165257 A1* | 7/2008 | Boettiger .......... H01L 27/14603 348/222.1 |
| 2010/0053555 A1 | 3/2010 | Enriquez et al. |
| 2011/0176797 A1* | 7/2011 | Lu .......................... G03B 17/02 396/430 |
| 2013/0070109 A1 | 3/2013 | Gove et al. |
| 2016/0225191 A1 | 8/2016 | Mullins |
| 2018/0007255 A1 | 1/2018 | Tang |
| 2018/0081178 A1* | 3/2018 | Shpunt ................... G06F 3/011 |
| 2018/0275410 A1 | 9/2018 | Yeoh et al. |

FOREIGN PATENT DOCUMENTS

| | | |
|---|---|---|
| CN | 104067160 A | 9/2014 |
| CN | 106199958 A | 12/2016 |

\* cited by examiner

HEAD-MOUNTED DEVICE WITH ACTIVE OPTICAL FOVEATION

This application is a continuation of non-provisional patent application Ser. No. 16/130,775, filed Sep. 13, 2018, which claims the benefit of provisional patent application No. 62/662,410, filed Apr. 25, 2018, which are hereby incorporated by reference herein in their entireties.

BACKGROUND

This relates generally to head-mounted devices, and, more particularly, to head-mounted devices with displays and image sensors.

Electronic devices often include displays and image sensors. Particularly when high-resolution images are being displayed for a viewer, it may be burdensome to display images at full resolution across an entire display. Foveation techniques involve displaying only critical portions of an image at full resolution and can help reduce the burdens on a display system. In some cases, images of the environment of the user may be displayed on the display. However, it may be burdensome to use the image sensor to obtain high-resolution images of the user's entire environment.

SUMMARY

An electronic device such as a head-mounted device may have a display. In some cases, the display may be a transparent display so that a user may observe real-world objects through the display while computer-generated content is overlaid on top of the real-world objects by presenting computer-generated images on the display. The display may also be an opaque display that blocks light from real-world objects when a user operates the head-mounted device. In this type of arrangement, a pass-through camera may be used to display real-world objects to the user.

The pass-through camera may capture images of the real world and the real-world images may be displayed on the display for viewing by the user. Additional computer-generated content (e.g., text, game-content, other visual content, etc.) may optionally be overlaid over the real-world images to provide an augmented reality environment for the user.

The display may be a foveated display. Using a gaze-tracking system in the head-mounted device, the device may determine which portion of the display is being viewed directly by a user. A user will be less sensitive to artifacts and low resolution in portions of the display that lie within the user's peripheral vision than portions of the display that are being directly viewed. Accordingly, the device may display different portions of an image with different resolutions.

The pass-through camera may capture some high-resolution image data for displaying on the display. However, only low-resolution image data may be needed to display low-resolution images in the periphery of the user's field of view on the display. Therefore, the pass-through camera may only capture high-resolution images that correspond to the portion of the user's field-of-view that is being directly viewed and may capture lower resolution image data that corresponds to the real-world objects in the user's peripheral vision. Adjusting the pass-through camera to only capture high-resolution image data in selected portions of the user's field of view may reduce processing burden and power consumption within the head-mounted device.

There are a number of possible arrangements for the pass-through camera that allow the camera module to selectively capture high-resolution images. For example, the front-facing camera may include an image sensor with two or more pixel densities, a distortion lens, and/or one or more planar or curved mirrors. Any of the components in the camera module may be adjusted to change which portion of a scene is captured with high-resolution image data.

DETAILED DESCRIPTION

Head-mounted devices and other devices may be used for virtual reality and augmented reality systems. These devices may include portable consumer electronics (e.g., portable electronic devices such as cellular telephones, tablet computers, glasses, other wearable equipment), head-up displays in cockpits and vehicles, display-based equipment (e.g., projectors, televisions), etc. Devices such as these may include transparent displays and other optical components. Device configurations in which virtual reality and/or augmented reality content is provided to a user with a head-mounted display are described herein as an example. This is, however, merely illustrative. Any suitable equipment may be used in providing a user with virtual reality and/or augmented reality content.

A head-mounted device that is worn on the head of a user may be used to provide a user with computer-generated content that is overlaid on top of real-world content. With some head-mounted devices, the real-world content may be viewed directly by a user (e.g., by observing real-world objects through a transparent display panel or through an optical coupler in a transparent display system that merges light from real-world objects with light from a display panel). Other head-mounted devices may use configurations in which images of real-world objects are captured by a forward-facing camera and displayed for a user on a display. A forward-facing camera that captures images of the real-world and displays the images on the display may be referred to as a pass-through camera.

The pass-through camera may be capable of capturing high-resolution images to display to the user. However, a user will be less sensitive to artifacts and low resolution in portions of the display that lie within the user's peripheral vision than portions of the display that are being directly viewed. Therefore, to reduce the processing burden and power consumption involved in operating the pass-through camera, the pass-through camera may only capture high-resolution images that correspond to where the user is directly looking. Other portions of the captured image (that correspond to the user's peripheral vision) may have a lower resolution.

Figure 1:
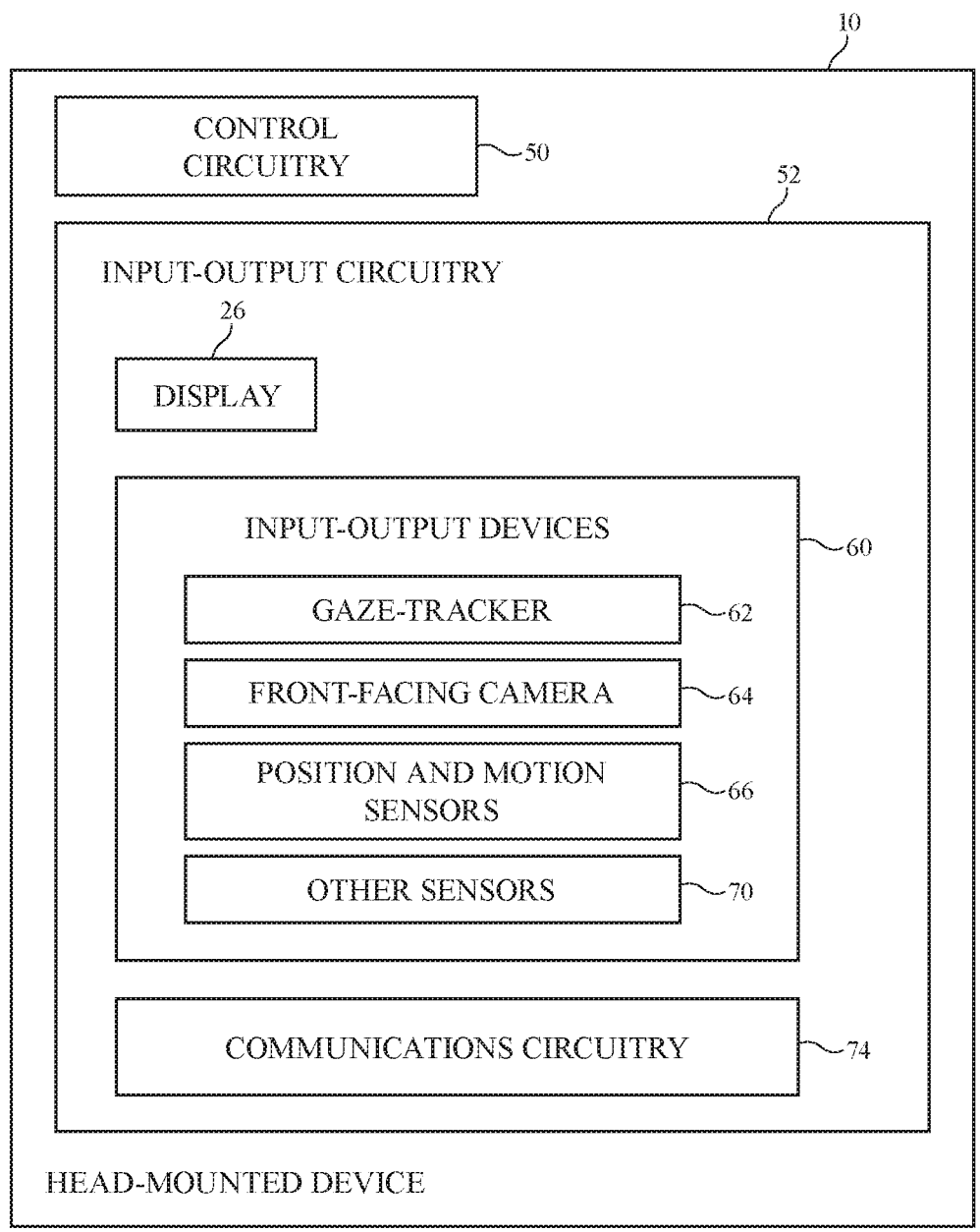
FIG. 1 is a schematic diagram of an illustrative head-mounted device in accordance with an embodiment.

A schematic diagram of an illustrative head-mounted device is shown in FIG. 1. As shown in FIG. 1, head-mounted device 10 (sometimes referred to as head-mounted display 10) may have control circuitry 50. Control circuitry 50 may include storage and processing circuitry for controlling the operation of head-mounted device 10. Circuitry 50 may include storage such as hard disk drive storage, non-volatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement control operations for head-mounted device 10 (e.g., data gathering operations, operations involving the adjustment of components using control signals, etc.).

Head-mounted device 10 may include input-output circuitry 52. Input-output circuitry 52 may be used to allow data to be received by head-mounted device 10 from external equipment (e.g., a tethered computer, a portable device such as a handheld device or laptop computer, or other electrical equipment) and to allow a user to provide head-mounted device 10 with user input. Input-output circuitry 52 may also be used to gather information on the environment in which head-mounted device 10 is operating. Output components in circuitry 52 may allow head-mounted device 10 to provide a user with output and may be used to communicate with external electrical equipment.

As shown in FIG. 1, input-output circuitry 52 may include a display such as display 26. Display 26 may be used to display images for a user of head-mounted device 10. Display 26 may be a transparent display so that a user may observe real-world objects through the display while computer-generated content is overlaid on top of the real-world objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 26 may be an opaque display that blocks light from real-world objects when a user operates head-mounted device 10. In this type of arrangement, a pass-through camera may be used to display real-world objects to the user. The pass-through camera may capture images of the real world and the real-world images may be displayed on the display for viewing by the user. Additional computer-generated content (e.g., text, game-content, other visual content, etc.) may optionally be overlaid over the real-world images to provide an augmented reality environment for the user. When display 26 is opaque, the display may also optionally display entirely computer-generated content (e.g., without displaying real-world images) to provide a virtual reality environment for the user.

The head-mounted device may optionally include adjustable components stacked in series with display 26. For example, the head-mounted device may include an adjustable polarizer (e.g., a polarizer with switches that allow selected regions of the adjustable polarizer to be configured to serve as vertical-pass linear polarizers, horizontal-pass linear polarizers, or non-polarizing regions), tunable lenses (e.g., liquid crystal tunable lenses, tunable lenses based on electrooptic materials, tunable liquid lenses, microelectromechanical systems tunable lenses, or other tunable lenses), an adjustable color filter (e.g., an adjustable-color-cast light filter that can be adjusted to exhibit different color casts and/or a monochromatic adjustable-intensity light filter that has a single color cast), and/or an adjustable opacity system (e.g., a layer with an adjustable opacity for providing a darkened background if the display is transparent). There may be any suitable number of display pixels in display 26 (e.g., 0-1000, 10-10,000, 1000-1,000,000, 1,000,000 to 10,000,000, more than 1,000,000, fewer than 1,000,000, fewer than 10,000, fewer than 100, etc.).

Input-output circuitry 52 may include components such as input-output devices 60 for gathering data and user input and for supplying a user with output. Devices 60 may include a gaze-tracker such as gaze-tracker 62 (sometimes referred to as a gaze-tracking system or a gaze-tracking camera) and a camera such as camera 64.

Gaze-tracker 62 may include a camera and/or other gaze-tracking system components (e.g., light sources that emit beams of light so that reflections of the beams from a user's eyes may be detected) to monitor the user's eyes. Gaze-tracker(s) 62 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 62 is merely illustrative.

Cameras such as front-facing camera(s) 64 (sometimes referred to as front-facing camera module 64 or camera module 64) may be used to capture images of the real-world environment surrounding the user. For example, one or more front-facing cameras 64 may be used to capture images of real-world objects in front of a user and on the left and right sides of a user's field of view. The images of real-world objects that are gathered in this way may be presented for the user on display 26 and/or may be processed by control circuitry 50 to determine the locations of electronic devices (e.g., displays, etc.), people, buildings, and other real-world objects relative to the user. The real-world environment may also be analyzed using image processing algorithms. Information from camera 64 may be used in controlling display 26.

Front-facing camera 64 may serve as a pass-through camera that obtains images of the real-world environment of the user. The real-world images corresponding to the user's field of view (as determined by the gaze-tracker and the position of the head-mounted device) are then displayed on display 26. In this way, the user perceives that they are viewing the real world (by replicating real-world viewing with the pass-through camera and display).

In addition to adjusting components such as display 26 based on information from gaze-tracker 62 and/or front-facing cameras 64, control circuitry 50 may gather sensor data and user input from other input-output circuitry 52 to use in controlling head-mounted device 10. As shown in FIG. 1, input-output devices 60 may include position and motion sensors 66 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Using sensors 66, for example, control circuitry 50 can monitor the current direction in which a user's head is oriented relative to the surrounding environment. Movements of the user's head (e.g., motion to the left and/or right to track on-screen objects and/or to view additional real-world objects) may also be monitored using sensors 66.

Input-output devices 60 may also include other sensors and input-output components 70 (e.g., ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, microphones, speakers, audio components, haptic output devices, light-emitting diodes, other light sources, etc.). Circuitry 52 may include wired and wireless communications circuitry 74 that allows head-mounted device 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted device 10. Head-mounted device 10 may include any other desired components. For example, the head-mounted device may include a battery.

Figure 2:
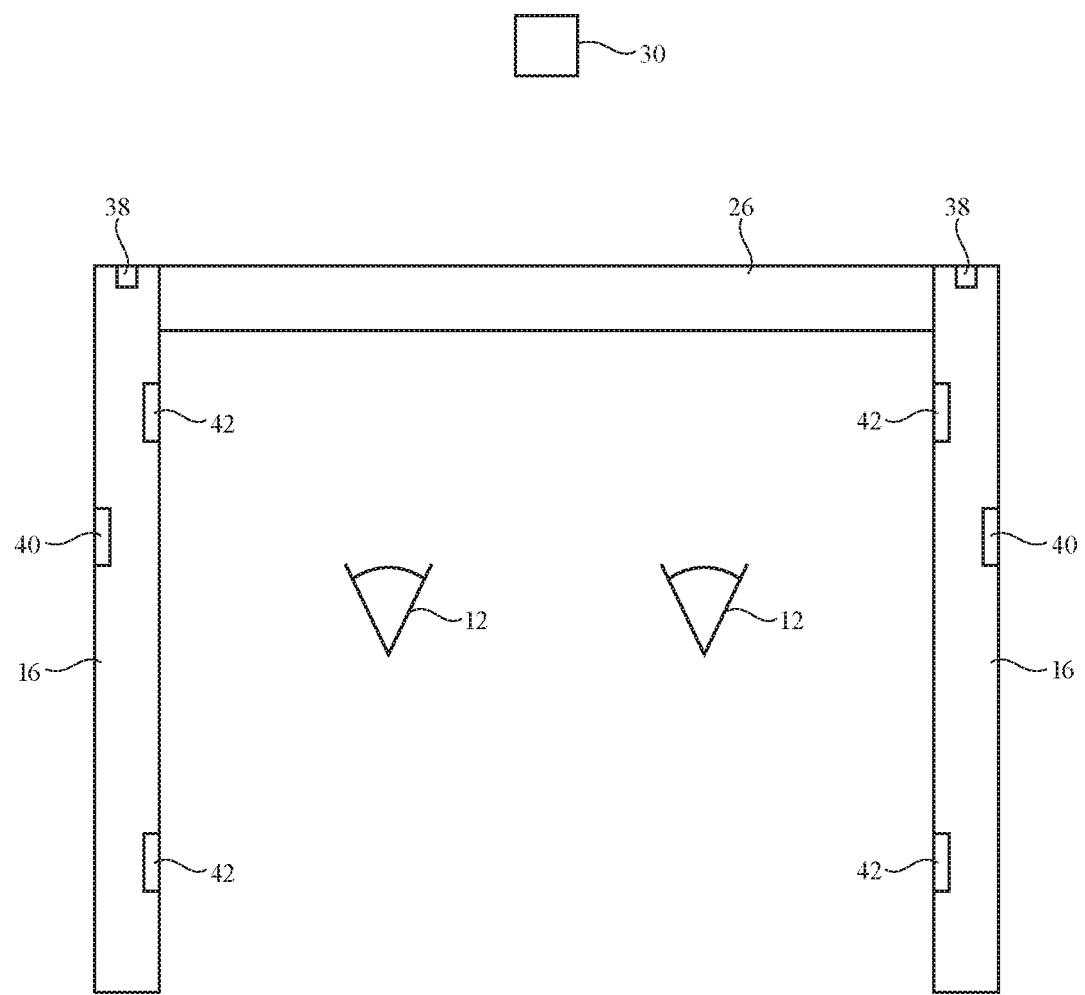
FIG. 2 is a top view of an illustrative head-mounted device in accordance with an embodiment.

The components of head-mounted device 10 may be supported by a head-mountable support structure such as illustrative support structure 16 of FIG. 2. Support structure 16 may have the shape of a frame of a pair of glasses (e.g., left and right temples and other frame members), may have a helmet shape, or may have another head-mountable configuration. When worn on the head of a user, the user may view real-world objects such as object 30 through display 26 in configurations where display 26 is a transparent display. In configurations where display 26 is opaque, the user's eyes 12 may be blocked from viewing object 30. Display 26 is supported by support structure 16 and is placed in front of user eyes 12 when worn on the head of the user.

Support structure 16 may support additional components at additional locations such as locations 38, 40, and 42. For example, components may be mounted on the front of support structure 16 in location 38. Front-facing cameras 64 and/or sensors and other components in input-output circuitry 52 may be mounted in location 38. The components in location 38 may be used to detect the positions of real-world objects (e.g., object 30) and/or for capturing images of the real-world. Object 30 may include natural and manmade objects, people, buildings, sources of glare such as reflective objects, the sun, lights, etc.

Input-output devices 60 such as position and motion sensors 66, light detectors, or other desired input-output devices may be mounted in location 40. Components in location 40 may face the environment of the user (e.g., outward facing components facing away from the user). In contrast, components in location 42 may face the user (e.g., inward facing components facing the user). Input-output devices 60 such as gaze-tracker 62 (image sensors), speakers (e.g., ear speakers) or other audio components that play audio (e.g., audio associated with computer-generated images and/or other content that is being displayed using display 26, etc.) or other desired input-output devices may be mounted in location 42.

Display 26 may be a foveated display. Using gaze-tracking (e.g., using gaze-tracker 62 to capture information on the location of a user's gaze on display 26), device 10 can determine which portion of display 26 is being viewed only by a user's peripheral vision and which portion of display 26 is being viewed directly (non-peripherally) by a user (e.g., in the centermost 5° of the user's field of view corresponding to the fovea of the user's eyes where visual acuity is elevated). A user will be less sensitive to artifacts and low resolution in portions of display 26 that lie within the user's peripheral vision than portions of display 26 that are being directly viewed. Accordingly, device 10 may display different portions of an image with different resolutions.

Figure 3:
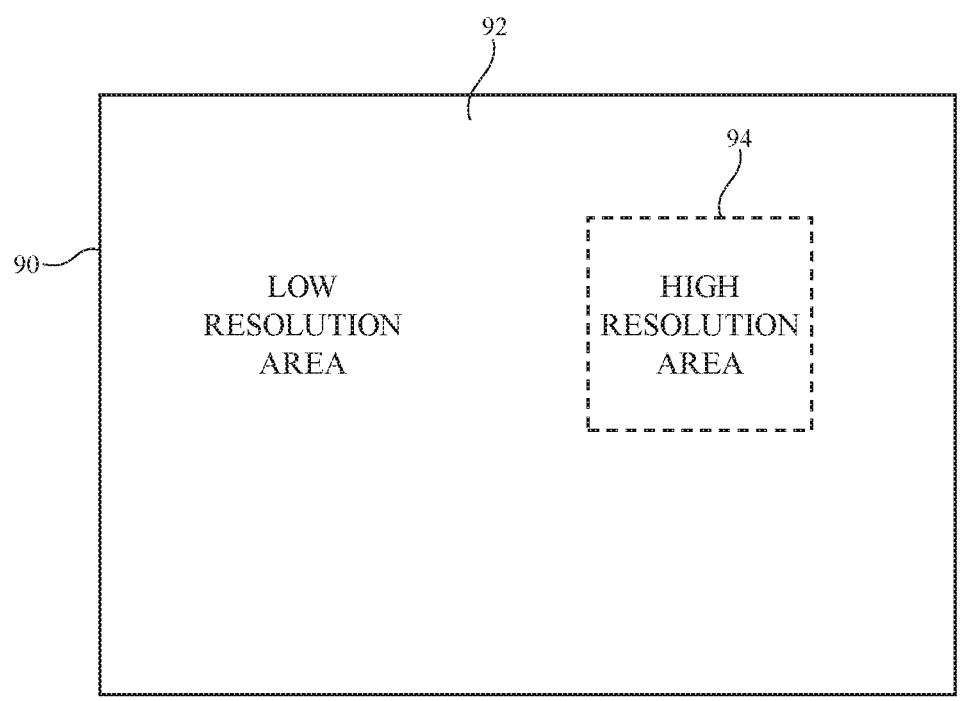
FIG. 3 is a diagram showing how high-resolution images may be displayed in a first portion of a user's field of view whereas low-resolution images may be displayed in a second portion of a user's field of view in accordance with an embodiment.

FIG. 3 shows a field of view 90 corresponding to the field of view of the user while wearing head-mounted device 10. The user may look at region 94 of the display 26. Accordingly, images on the display in region 94 may be presented with a relatively high resolution. If desired, images may be presented on the display at a high resolution across the user's entire field of view. However, to conserve processing burden and power consumption, regions of the display that the user is not directly viewing (e.g., the user's peripheral vision) such as region 92 may present low-resolution images (e.g., at a lower resolution than in region 94).

In some cases (e.g., when the device is in a pass-through mode), display 26 displays real-world images corresponding to what the user would see in the absence of the head-mounted device. When the device is in the pass-through mode, the entire display may display real-world images that are captured by a camera in the device (e.g., front-facing camera 64 in FIG. 1). In this mode, the display may present high-resolution images corresponding to the real world in region 94. Therefore, front-facing camera 64 must be capable of capturing high-resolution images. However, only low-resolution image data is needed to display the low-resolution images in region 92.

If desired, front-facing camera 64 may capture only high-resolution images. Control circuitry 50 may then process the image data to present the high-resolution images in region 94 while presenting lower resolution images in region 92. In other words, some of the captured high-resolution image data is discarded to present lower resolution images in region 92. However, capturing excess image data (that will ultimately be discarded) may use valuable processing and power resources. So, instead of capturing excess high-resolution image data, front-facing camera 64 may instead only capture high-resolution images that correspond to the portion of the user's field-of-view that is being directly viewed. Front-facing camera 64 captures lower resolution image data that corresponds to the real-world objects in the user's peripheral vision. Adjusting front-facing camera 64 to only capture high-resolution image data in selected portions of the user's field of view may reduce processing burden and power consumption within head-mounted device 10.

There are a number of possible arrangements for camera module 64 (sometimes referred to as an outward-facing camera or an imaging system) that allow the camera module to selectively capture high-resolution images. For example, the front-facing camera may include an image sensor with two or more pixel densities, a distortion lens, and/or one or more planar or curved mirrors. Any of the components in the camera module may be adjusted to change which portion of a scene is captured with high-resolution image data.

Figure 4:
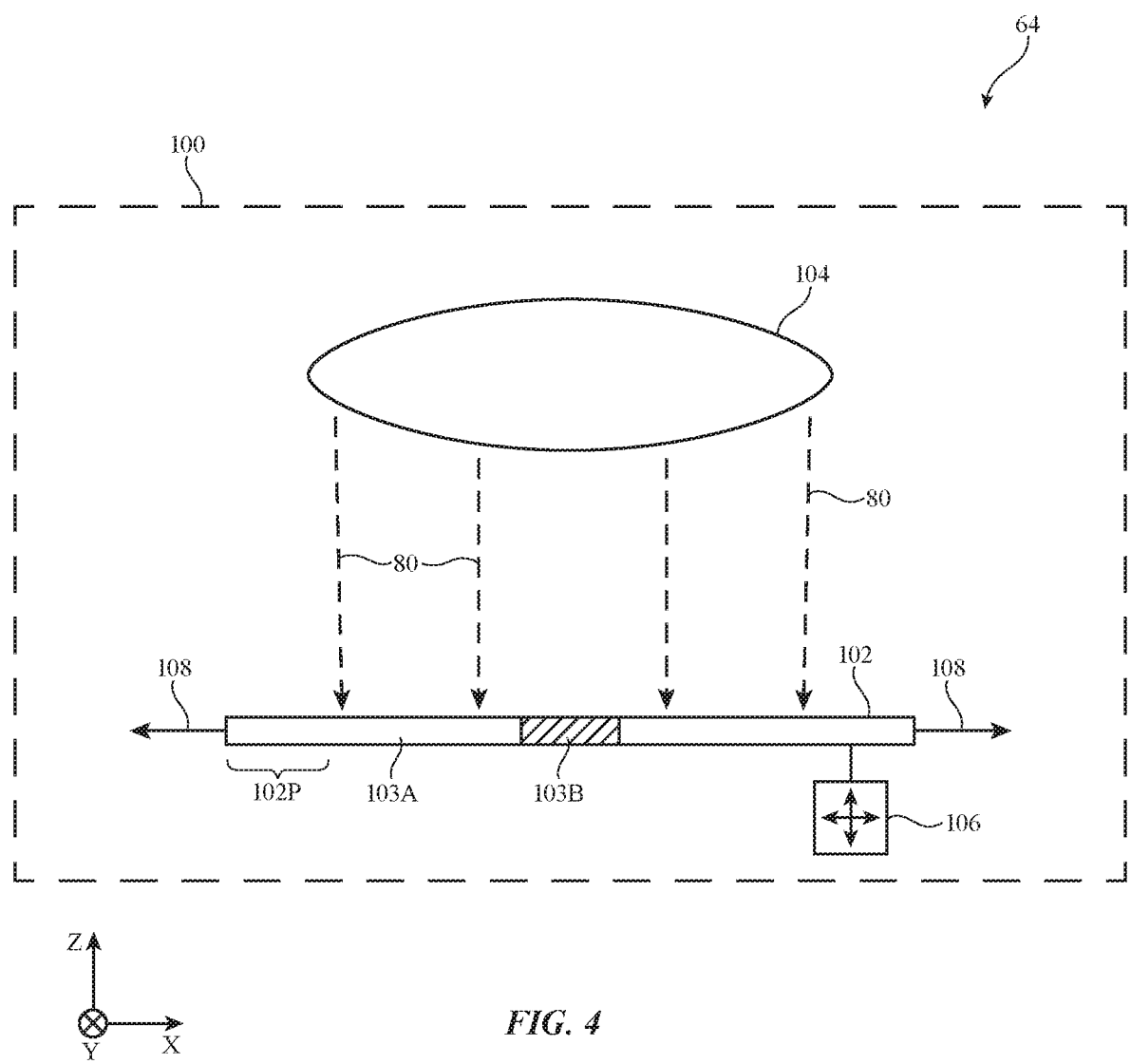
FIG. 4 is a cross-sectional side view of an illustrative camera module that includes an image sensor with a varying pixel density that is positioned by positioning equipment in accordance with an embodiment.

FIG. 4 is a cross-sectional side view of an illustrative camera module 64 with an image sensor that has a non-constant pixel density across the sensor. As shown in FIG. 4, camera module 64 includes an image sensor 102 having a first pixel density portion 103A and a second pixel density portion 103B. The first and second pixel density portions 103A and 103B have different respective pixel densities. In particular, the second pixel density portion 103B of image sensor 102 may have a greater pixel density than first pixel density portion 103A. Second pixel density portion 103B may therefore be referred to as high pixel density portion 103B and first pixel density portion 103A may be referred to as low pixel density portion 103A. High pixel density portion 103B may have more pixels-per-inch (PPI) than low pixel density portion 103A. The high pixel density portion 103B will capture image data having a higher resolution than the low pixel density portion 103A.

Camera module 64 may include one or more lenses such as lens 104 for focusing incident light corresponding to the captured real-world scene (e.g., light 80) onto image sensor 102. Some of the incident light (e.g., a first portion of the captured scene) will be received by high pixel density portion 103B of the image sensor whereas some of the incident light (e.g., a second portion of the captured scene) will be received by low pixel density portion 103A of the image sensor. High-resolution image data will therefore be obtained of the first portion of the captured scene, whereas low-resolution image data will be obtained of the second portion of the captured scene.

Camera module 64 may also include positioning equipment 106 for adjusting the position of image sensor 102. In particular, positioning equipment 106 may adjust the position of image sensor 102 to adjust which portion of the incoming light (e.g., which portion of the captured scene) is imaged by the high pixel density portion of the image sensor. Arrows 108 show how the image sensor may be shifted laterally (e.g., within the XY-plane) by positioning equipment 106. Positioning equipment 106 may position image sensor 102 underneath lens 104 based on sensor information (e.g., information from gaze-tracker 62 and/or position and motion sensors 66). This sensor information may be used to determine a point of gaze of the user (e.g., the point to which the user is looking). Positioning equipment 106 may then move image sensor 102 such that high pixel density portion 103B of the image sensor receives light corresponding to the point of gaze of the user (e.g., the portion of the scene at which the user is looking).

Positioning equipment 106 may include any desired components. For example, the positioning equipment may include one or more of a motor (e.g., a servomotor, a geared motor, a brushless motor, etc.), a linear electromagnetic actuator (e.g., a solenoid), a piezoelectric device, an electroactive polymer, a pneumatic actuator, and any other suitable type of actuator. Positioning equipment 106 may be configured to move image sensor 102 within the XY-plane, move image sensor 102 vertically along the Z-axis, and/or tilt image sensor 102 (such that the image sensor is at an angle relative the XY-plane).

If desired, the components of camera module 64 may be formed in housing 100 (sometimes referred to as camera module housing 100). Housing 100 may support image sensor 102, lens 104, and/or positioning equipment 106.

Image sensor 102 may have an increased pixel area to account for the movement of the image sensor underneath lens 104. In particular, it is desirable for image sensor 102 to capture all of the incoming light corresponding to the captured scene, regardless of the position of high pixel density portion 103B. When, high pixel density pixel portion 103B is centered underneath lens 104 (as in FIG. 4), the periphery of the image sensor (102P) may not receive incident light. However, consider an example where the image sensor is shifted laterally along the X-axis (e.g., to align high pixel density portion 103B under the right-most edge of lens 104) in FIG. 4. The peripheral portion of the image sensor may be shifted to now receive incident light (e.g., from the left-most edge of lens 104). Therefore, ensuring that image sensor 102 has a larger area than is necessary to capture all of the incident light (while the sensor is centered) ensures that all of the incident light will still be captured even if the sensor is shifted to move the high pixel density portion of the sensor to the edges of the captured scene.

Figure 5:
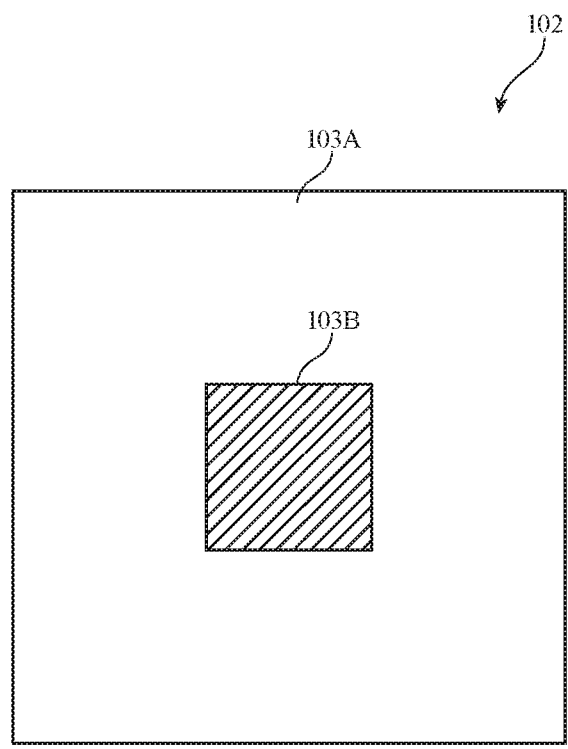
FIG. 5 is a top view of an illustrative image sensor of the type included in FIG. 4 in accordance with an embodiment.

FIG. 5 is a top view showing show image sensor 102 may have a high pixel density region 103B and a low pixel density region 103A. As shown in FIG. 5, the low pixel density region 103A may laterally surround the high pixel density region 103B. This example is merely illustrative. If desired, image sensor 102 may include any desired number of different pixel density regions, with each pixel density region having any desired shape and any desired pixel density. There may be a gradual transition between the pixel densities of adjacent pixel density regions if desired.

The example in FIGS. 4 and 5 of image sensor 102 having different pixel density regions is merely illustrative. If desired, a camera module may instead use a distortion lens to magnify a portion of a captured scene, thus obtaining high-resolution image data for the portion of the captured scene. An arrangement of this type is shown in FIG. 6.

Figure 6:
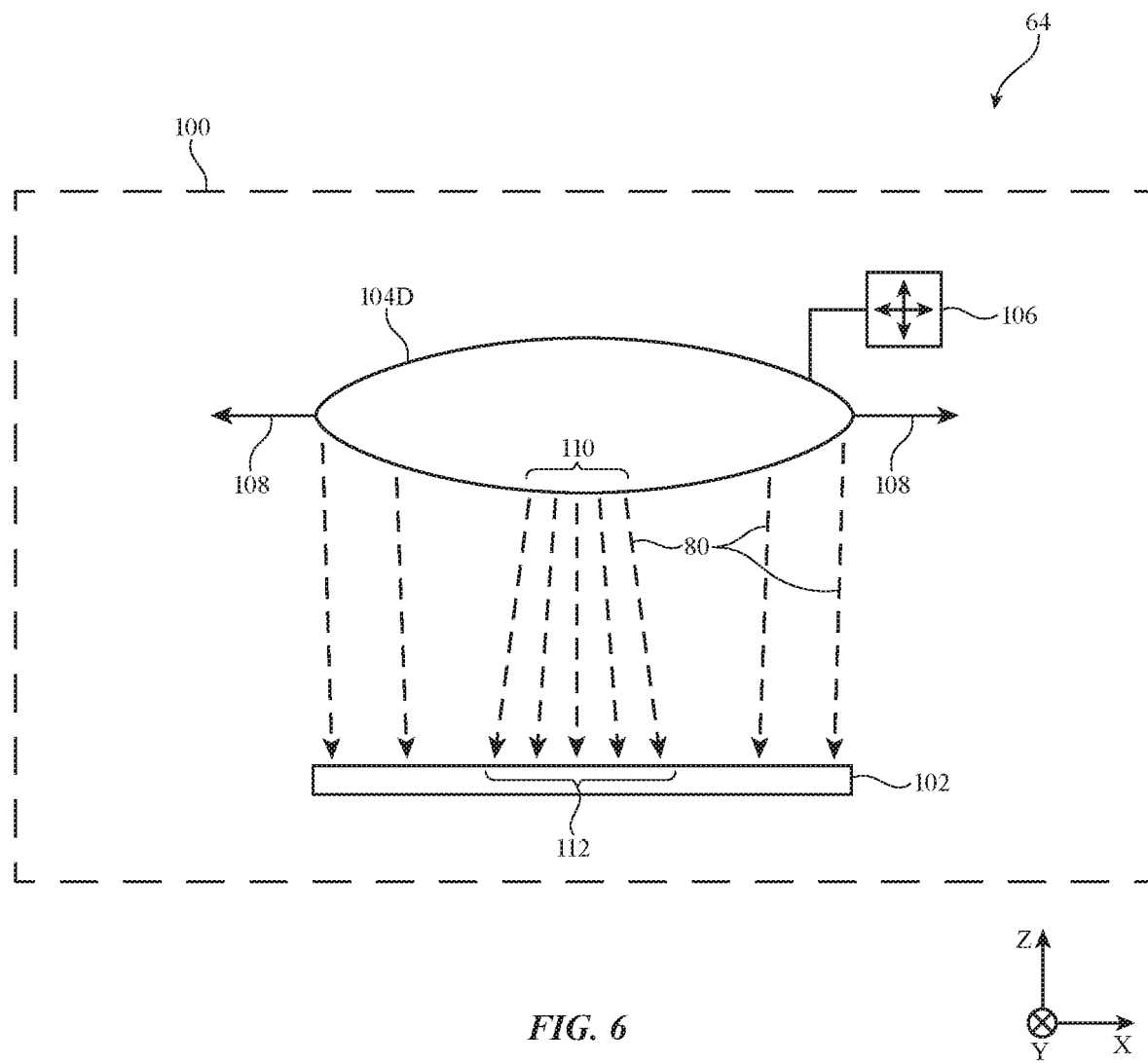
FIG. 6 is a cross-sectional side view of an illustrative camera module that includes a distortion lens that is positioned by positioning equipment in accordance with an embodiment.

As shown in FIG. 6, camera module 64 includes an image sensor 102 with a fixed pixel density across the image sensor. Similar to FIG. 4, image sensor 102 may receive incoming light 80 from a lens. However, in FIG. 4 light is provided to image sensor 102 with a uniform angular resolution. In contrast, in FIG. 6 light is provided to image sensor 102 with varying angular resolution. In particular, light in the center of the lens (for example) may be spread across a greater corresponding area of image sensor 102 than light at the periphery of the lens. As shown in FIG. 6, light corresponding to a first area 110 of the lens may be spread onto a larger area 112 of the image sensor. In other words, the portion of the captured scene received at area 110 of lens 104D is magnified by lens 104D. The light received at area 110 is spread over more pixels than if the light was not distorted by the lens. Having more pixels to capture image data for the same area of the incoming light means that the image data will be of a higher resolution than image data for the other portions of the image sensor.

To summarize, lens 104D may distort incoming light to optically stretch (e.g., magnify) a selected portion of the captured scene over a larger pixel area than if the light was not distorted (e.g., lens 104D selectively increases angular resolution of a selected portion the captured scene). The image sensor therefore obtains high-resolution image data for the selected portion of the captured scene. The remaining portions of the captured scene are not optically stretched (and may be optically compressed). The image sensor therefore obtains low-resolution image data (with at least a lower resolution than the high-resolution image data) for the remaining portions of the captured scene.

Camera module 64 may also include positioning equipment 106 for adjusting the position of lens 104D. In particular, positioning equipment 106 may adjust the position of lens 104D to adjust which portion of the incoming light (e.g., which portion of the captured scene) is optically stretched by the lens for obtaining high-resolution image data. Arrows 108 show how the lens may be shifted laterally (e.g., within the XY-plane) by positioning equipment 106. Positioning equipment 106 may be configured to move distortion lens 104D within the XY-plane, move distortion lens 104D vertically along the Z-axis, and/or tilt distortion lens 104D (such that the distortion lens is at an angle relative the XY-plane). Positioning equipment 106 may position distortion lens 104D based on sensor information (e.g., information from gaze-tracker 62 and/or position and motion sensors 66). This sensor information may be used to determine a point of gaze of the user (e.g., the point to which the user is looking). Positioning equipment 106 may then move distortion lens 104D such that optically stretched portion of the captured image (e.g., area 110) corresponds to the point of gaze of the user (e.g., the portion of the scene at which the user is looking).

Figure 7:
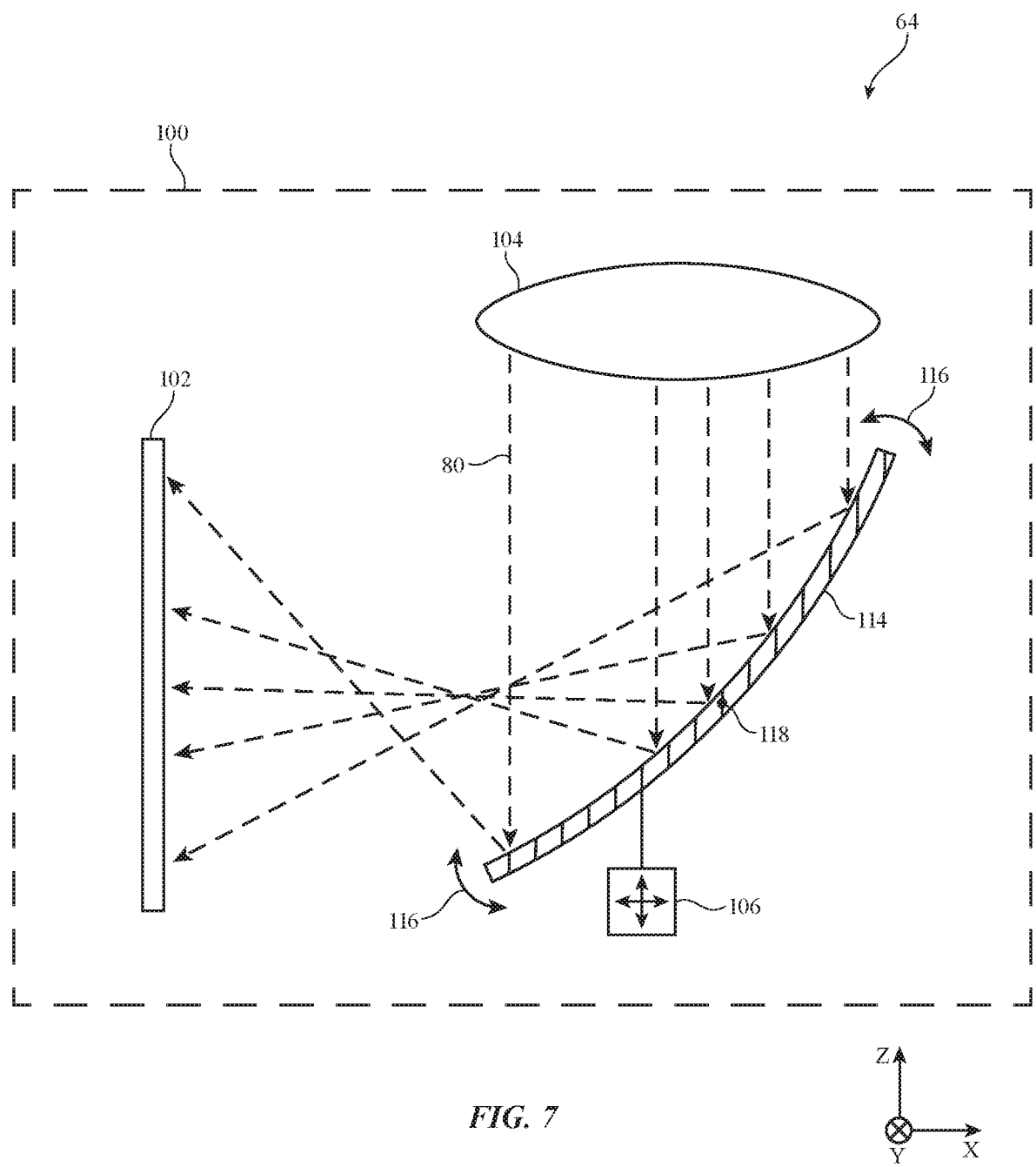
FIG. 7 is a cross-sectional side view of an illustrative camera module that includes a curved mirror that is positioned by positioning equipment in accordance with an embodiment.

In yet another embodiment, an additional optical component may be included in camera module 64 to enable image sensor 102 to generate high-resolution image data. As shown in FIG. 7, a mirror such as mirror 114 may be interposed in the optical path between lens 104 and image sensor 102. Mirror 114 may have any desired shape (e.g., curved or planar). Additionally, more than one mirror (e.g., an array of mirrors) may be included in the optical path between lens 104 and image sensor 102 if desired.

In FIG. 7, image sensor 102 may be an image sensor with a fixed pixel density (similar to as shown in FIG. 6) and lens 104 may not be a distortion lens (e.g., similar to lens 104 in FIG. 4). However, mirror 114 may distort incident image light (similar to the distortion lens 104D of FIG. 6). In other words, mirror 114 may distort the incident light from lens 104 to optically stretch (e.g., magnify) a selected portion of the captured scene over a larger pixel area than if the light was not distorted. The image sensor therefore obtains high-resolution image data for the selected portion of the captured scene. The remaining portions of the captured scene are not optically stretched (and may be optically compressed). The image sensor therefore obtains low-resolution image data (with at least a lower resolution than the high-resolution image data) for the remaining portions of the captured scene.

Camera module 64 may also include positioning equipment 106 for adjusting the position of mirror 114. In particular, positioning equipment 106 may adjust the position of mirror 114 to adjust which portion of the incoming light (e.g., which portion of the captured scene) is optically stretched by the mirror for obtaining high-resolution image data. Arrows 116 show how the mirror may be rotated (e.g., rotated about a central axis 118) by positioning equipment 106. Positioning equipment 106 may also be configured to move mirror 114 within the XY-plane, move mirror 114 vertically along the Z-axis, and/or tilt mirror 114. Positioning equipment 106 may position mirror 114 based on sensor information (e.g., information from gaze-tracker 62 and/or position and motion sensors 66). This sensor information may be used to determine a point of gaze of the user (e.g., the point to which the user is looking). Positioning equipment 106 may then move mirror 114 such that the optically stretched portion of the captured image corresponds to the point of gaze of the user (e.g., the portion of the scene at which the user is looking).

Figure 8:
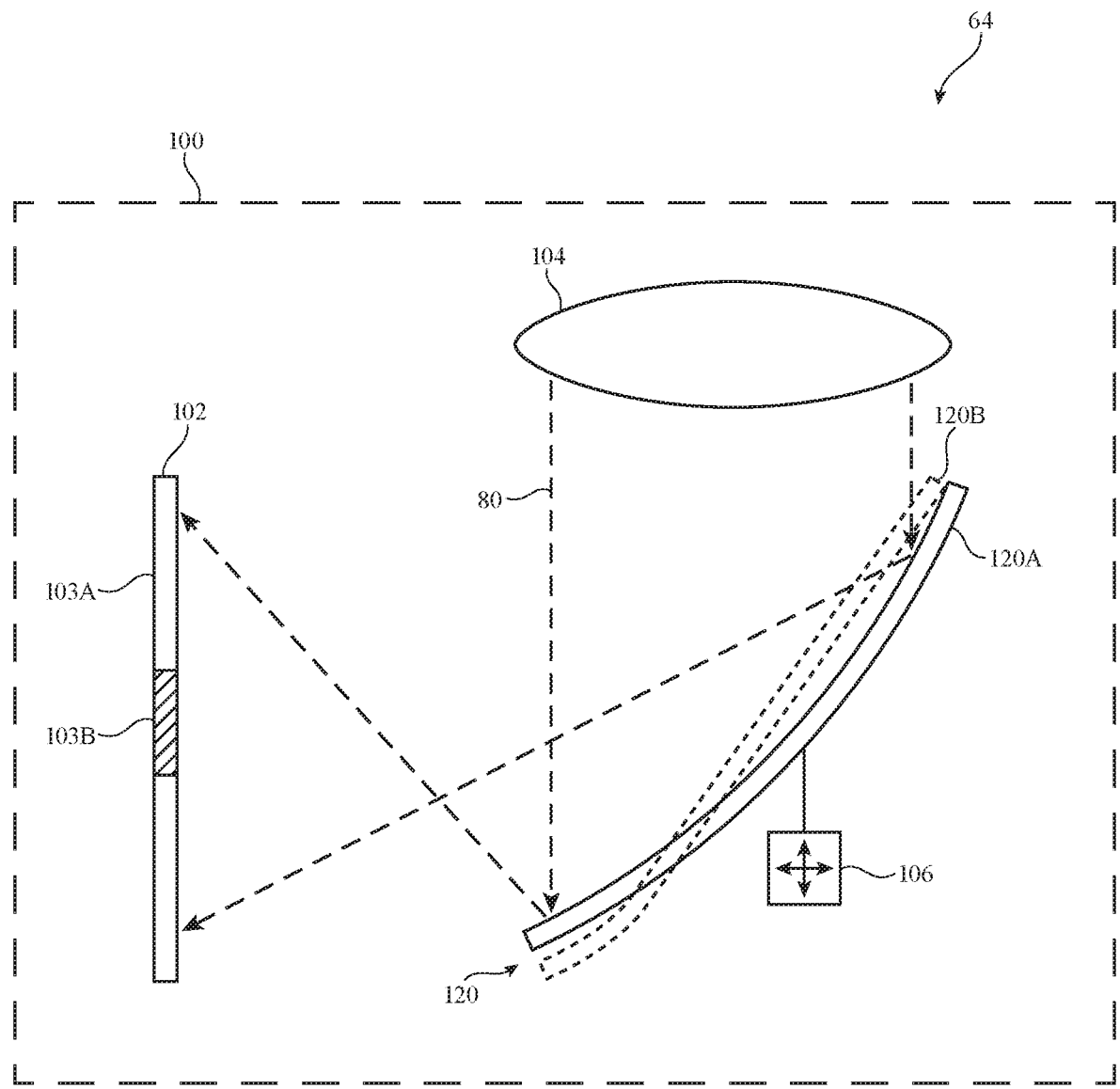
FIG. 8 is a cross-sectional side view of an illustrative camera module that includes an image sensor with a varying pixel density and a deformable mirror in accordance with an embodiment.

In yet another embodiment, shown in FIG. 8, a deformable mirror such as deformable mirror 120 may be interposed in the optical path between lens 104 and image sensor 102. In FIG. 8, image sensor 102 has two or more pixel density regions such as high pixel density region 103B and low pixel density region 103A. Deformable mirror 120 may determine which portion of the captured scene is directed to the high pixel density region 103B. In particular, deformable mirror 120 may have two or more states in which incoming light 80 from lens 104 is directed to different locations on image sensor 102. As shown in FIG. 8, deformable mirror 120 has a first state in which the mirror has a first shape 120A and a second state in which the mirror has a second shape 120B. Positioning equipment 106 may adjust deformable mirror 120 between different shapes (such as 120A and 120B) to control which portion of the captured scene is directed to high pixel density region 103B of the image sensor.

Positioning equipment 106 may control the shape of deformable mirror 120 based on sensor information (e.g., information from gaze-tracker 62 and/or position and motion sensors 66). This sensor information may be used to determine a point of gaze of the user (e.g., the point to which the user is looking). Positioning equipment 106 may then control the shape of deformable mirror 120 such that the portion of the captured image corresponding to the point of gaze of the user (e.g., the portion of the scene at which the user is looking) is directed to the high pixel density region of the image sensor.

The use of a single mirror in FIGS. 7 and 8 is merely illustrative. In both FIGS. 7 and 8, an array of mirrors may be used to redirect light between lens 104 and image sensor 102. Each mirror in the array of mirrors may be independently controlled (e.g., rotated as in FIG. 7 or deformed as in FIG. 8) by positioning equipment 106.

The aforementioned examples are merely illustrative, and various modifications may be made to the camera modules. In particular, any desired combinations of high distortion lenses, lenses without high distortion (sometimes referred to as low distortion lenses), deformable mirrors, rotatable mirrors, image sensors with constant pixel density, and image sensors with variable pixel density may be used in the camera module. Additionally, positioning equipment may move any of the components in the camera module in any desired manner.

Figure 9:
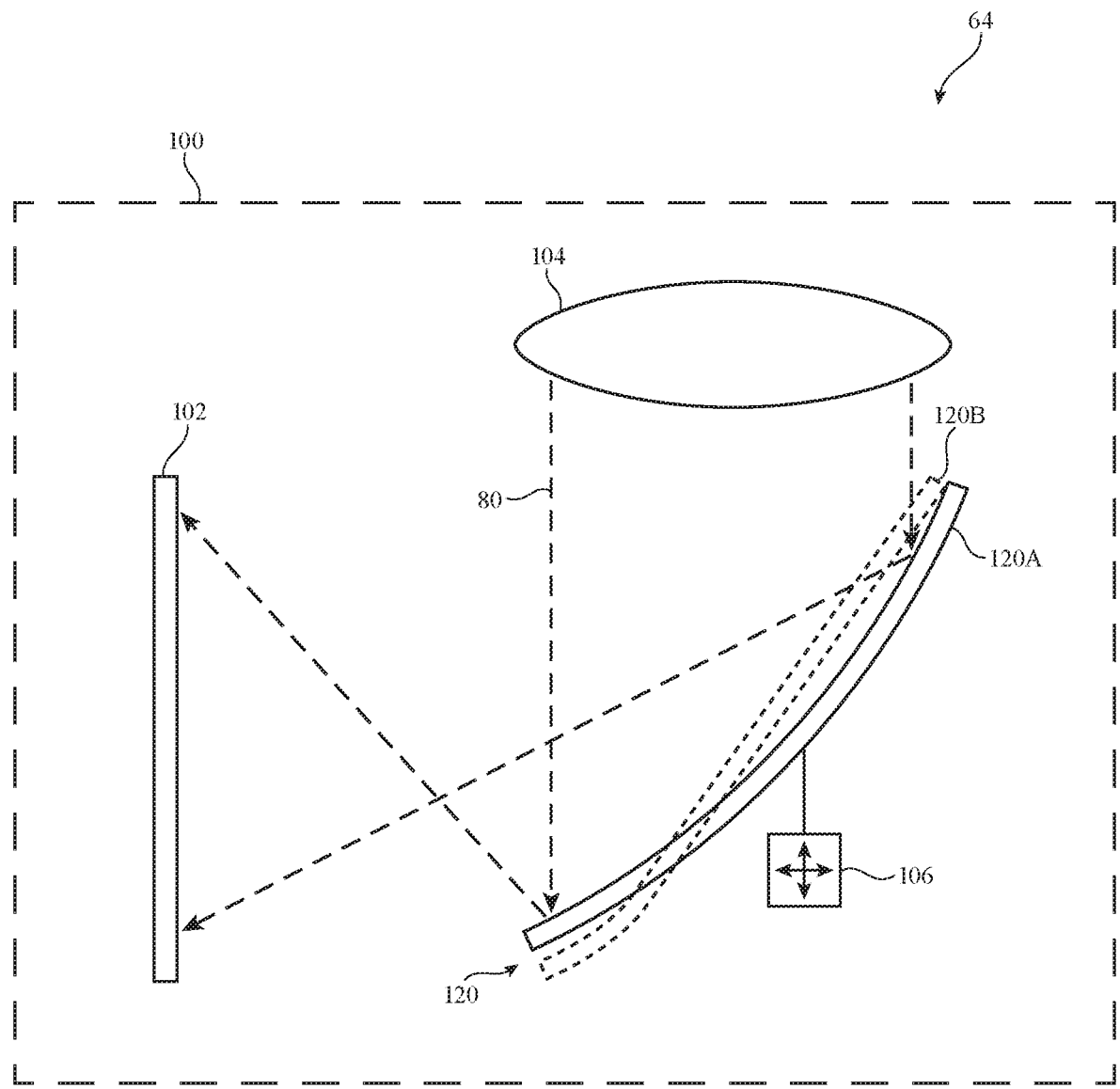
FIG. 9 is a cross-sectional side view of an illustrative camera module that includes an image sensor with a fixed pixel density and a deformable mirror in accordance with an embodiment.

FIG. 9 shows a camera module with a lens 104 and deformable mirror 120 that is controlled by positioning equipment 106 (similar to the camera module in FIG. 8). However, in FIG. 8 image sensor 102 has a varying pixel density, whereas in FIG. 9 image sensor 102 has a fixed pixel density. In FIG. 9, either lens 104 or mirror 120 may optically stretch incoming light to create the high-resolution image data. For example, lens 104 may be a high distortion lens (as in FIG. 6) that magnifies a portion of the captured scene. Alternatively, mirror 120 may distort a selected portion of the captured scene (similar to as discussed in connection with FIG. 7). Positioning equipment 106 may control the shape of deformable mirror 120 and/or may control the position of lens 104. Positioning equipment 106 may control the components in camera module 64 based on sensor information (e.g., information from gaze-tracker 62 and/or position and motion sensors 66).

Figure 10:
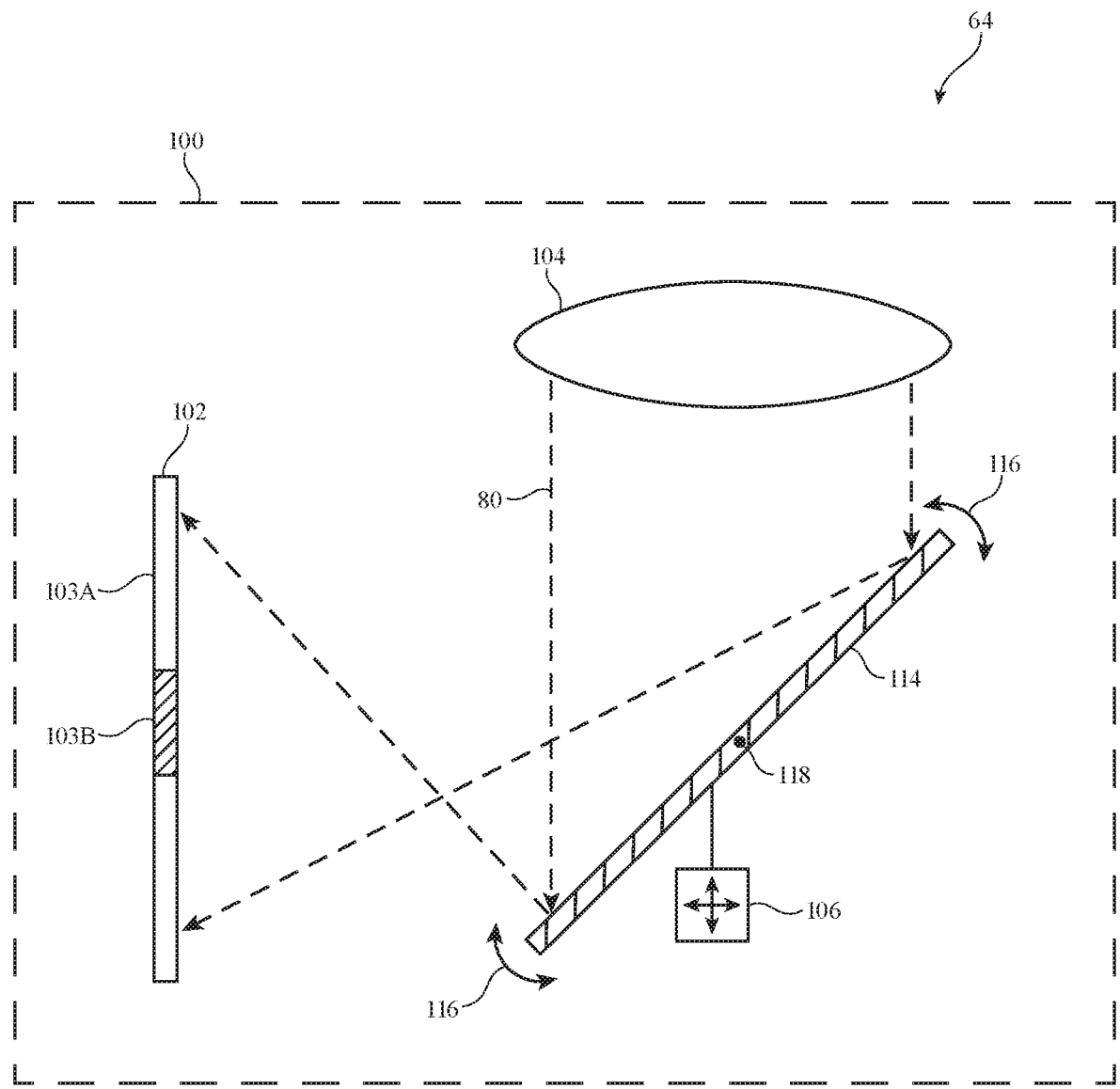
FIG. 10 is a cross-sectional side view of an illustrative camera module that includes an image sensor with a varying pixel density and a planar mirror that is positioned by positioning equipment in accordance with an embodiment.

In yet another embodiment, a planar mirror such as planar mirror 114 may be interposed in the optical path between lens 104 and image sensor 102, as shown in FIG. 10. In this embodiment, lens 104 may be a low distortion lens and planar mirror 114 may not distort the incoming light. Therefore, image sensor 102 may be a variable pixel density image sensor with high pixel density portion 103B and low pixel density portion 103A to enable capture of high-resolution image data. The planar mirror 114 is positioned to direct a desired portion of the captured scene to high pixel density portion 103B. The remaining portions of the captured scene are directed to the low pixel density portion 103A. The image sensor therefore obtains high-resolution image data for the desired portion of the captured scene and low-resolution image data (with at least a lower resolution than the high-resolution image data) for the remaining portions of the captured scene.

Camera module 64 may also include positioning equipment 106 for adjusting the position of planar mirror 114. In particular, positioning equipment 106 may adjust the position of planar mirror 114 to adjust which portion of the incoming light (e.g., which portion of the captured scene) is received by high pixel density region 103B. Arrows 116 show how the mirror may be rotated (e.g., rotated about a central axis 118) by positioning equipment 106. Positioning equipment 106 may also be configured to move mirror 114 within the XY-plane, move mirror 114 vertically along the Z-axis, and/or tilt mirror 114. Positioning equipment 106 may position mirror 114 based on sensor information (e.g., information from gaze-tracker 62 and/or position and motion sensors 66). This sensor information may be used to determine a point of gaze of the user (e.g., the point to which the user is looking). Positioning equipment 106 may then move mirror 114 such that the portion of the captured image directed to high pixel density region 103B corresponds to the point of gaze of the user (e.g., the portion of the scene at which the user is looking).

Figure 11:
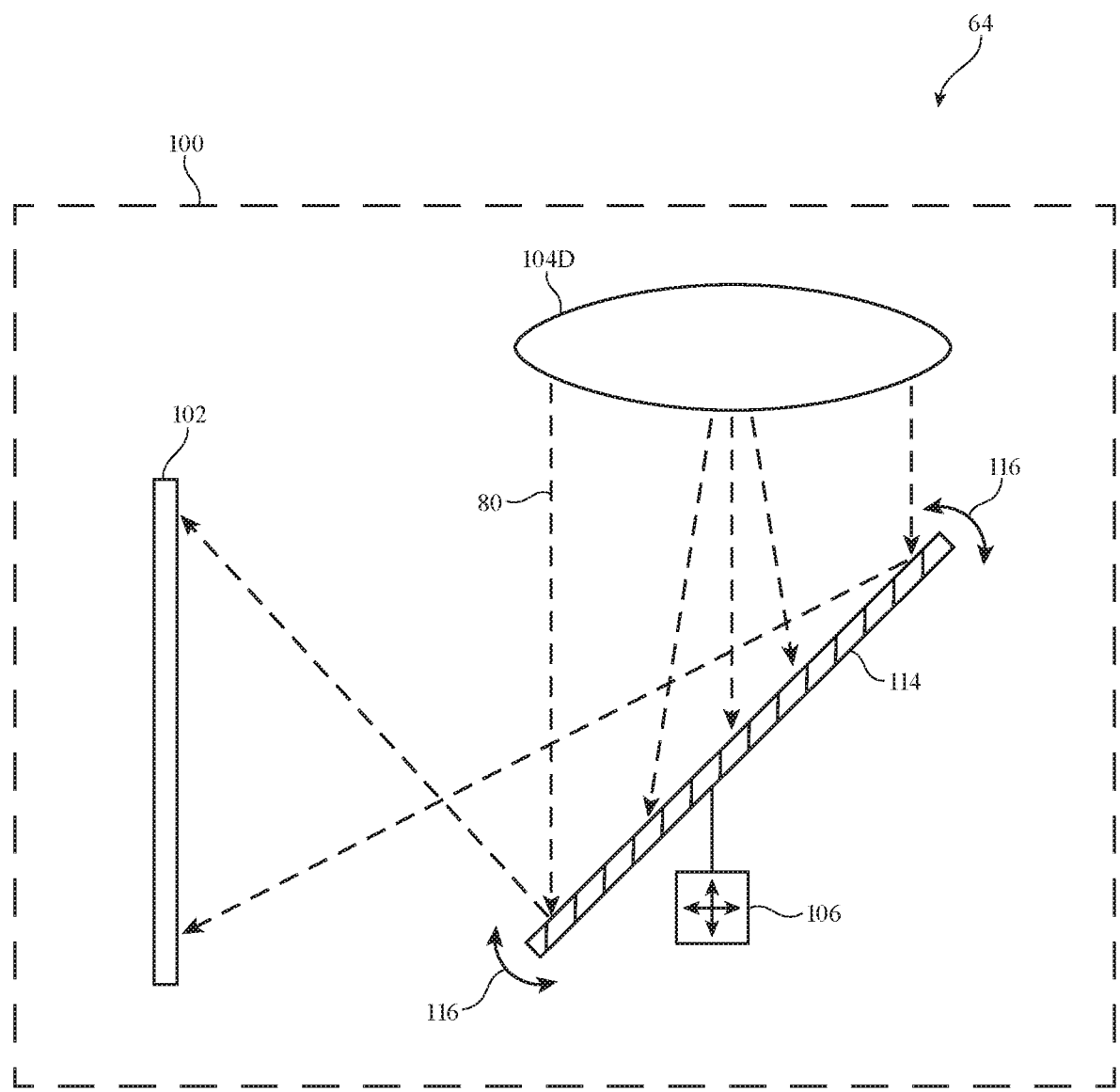
FIG. 11 is a cross-sectional side view of an illustrative camera module that includes an image sensor with a fixed pixel density and a planar mirror that is positioned by positioning equipment in accordance with an embodiment.

FIG. 11 shows an embodiment similar to the embodiment of FIG. 10, with both embodiments having a rotatable planar mirror 114. However, in FIG. 10 lens 104 is low distortion lens, whereas in FIG. 11, a distortion lens 104D magnifies a selected portion of the image. As shown in FIG. 11, distortion lens 104D optically stretches a portion of the captured scene (similar to as discussed in connection with FIG. 6). Positioning equipment may control the position of planar mirror 114 and/or the position of distortion lens 104D based on sensor information (e.g., information from gaze-tracker 62 and/or position and motion sensors 66). FIG. 11 shows an image sensor with a fixed pixel density, but the image sensor may have a varying pixel density if desired.

Figure 12:
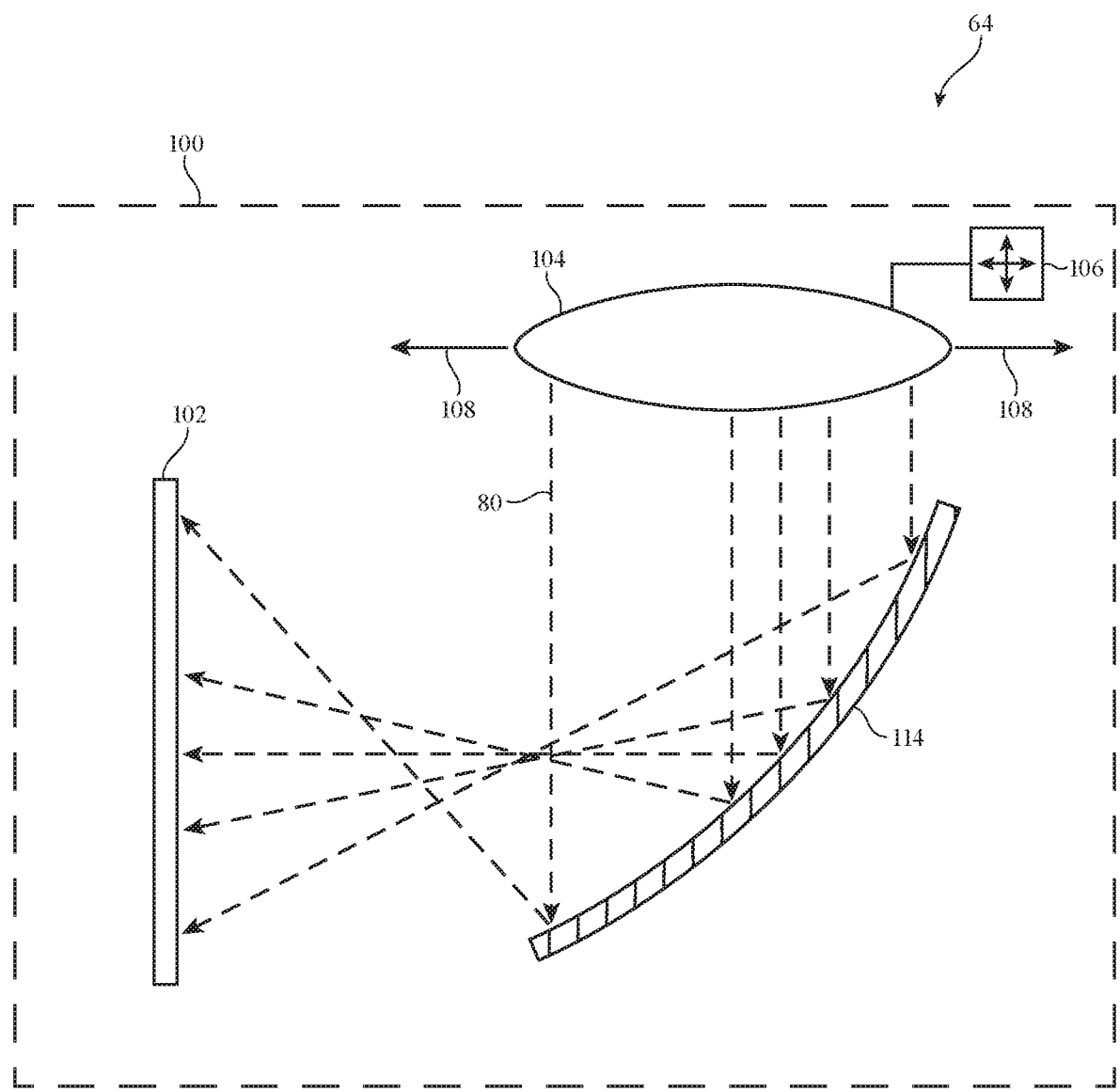
FIG. 12 is a cross-sectional side view of an illustrative camera module that includes a lens that is positioned by positioning equipment in accordance with an embodiment.

FIG. 12 show an embodiment similar to the embodiment of FIG. 7, with a lens 104, a mirror 114 that magnifies a portion of the incoming light, and a fixed pixel density image sensor 102. Lens 104 may provide light with a uniform angular resolution to curved mirror 114. Mirror 114 then magnifies a portion of the light and redirects the light towards image sensor 102. However, in FIG. 7 positioning equipment controlled the position of mirror 114 to control which portion of the scene was magnified for high-resolution image data. In FIG. 12, in contrast, positioning equipment 106 controls the position of lens 104 to control which portion of the scene is directed to the magnifying portion of mirror 114.

Arrows 108 show how the lens may be shifted laterally (e.g., within the XY-plane) by positioning equipment 106. Positioning equipment 106 may be configured to move lens 104 within the XY-plane, move lens 104 vertically along the Z-axis, and/or tilt lens 104 (such that the lens is at an angle relative the XY-plane). Positioning equipment 106 may position lens 104 based on sensor information (e.g., information from gaze-tracker 62 and/or position and motion sensors 66). This sensor information may be used to determine a point of gaze of the user (e.g., the point to which the user is looking). Positioning equipment 106 may then move lens 104 such that the portion of the captured image directed to the magnifying portion of mirror 114 corresponds to the point of gaze of the user (e.g., the portion of the scene at which the user is looking).

Figure 13:
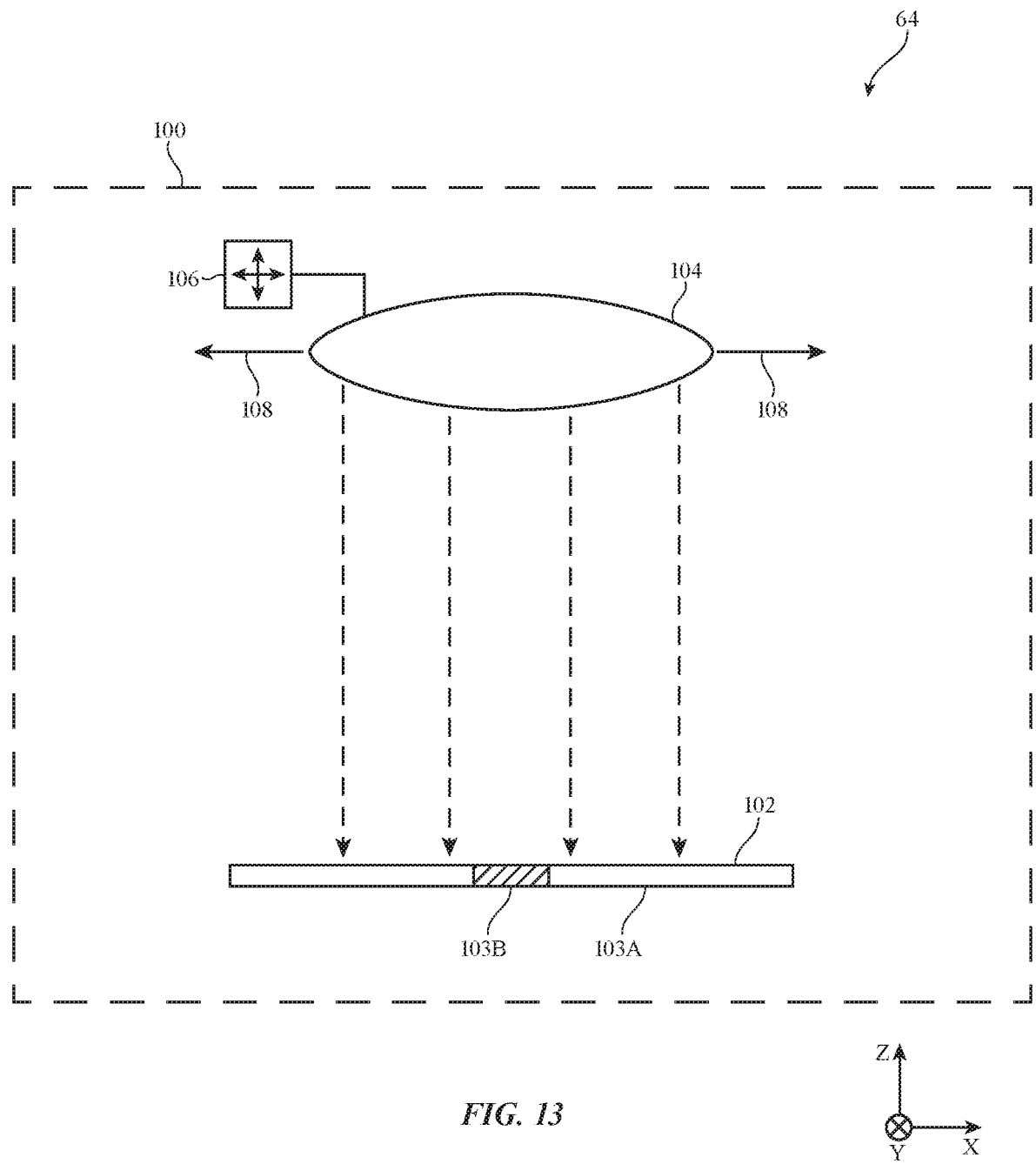
FIG. 13 is a cross-sectional side view of an illustrative camera module that includes an image sensor with a varying pixel density and a lens that is positioned by positioning equipment in accordance with an embodiment.

FIG. 13 shows an embodiment similar to the embodiment of FIG. 4, with a lens 104 and a variable pixel density image sensor 102 having a high pixel density region 103B and a low pixel density region 103A. Lens 104 may provide light with a uniform angular resolution to variable pixel density image sensor 102. However, in FIG. 4 positioning equipment controlled the position of image sensor 102 to control which portion of the scene was received by high pixel density region 103B. In FIG. 13, in contrast, positioning equipment 106 controls the position of lens 104 to control which portion of the scene is directed to high pixel density region 103B of the image sensor.

Arrows 108 show how the lens may be shifted laterally (e.g., within the XY-plane) by positioning equipment 106. Positioning equipment 106 may be configured to move lens 104 within the XY-plane, move lens 104 vertically along the Z-axis, and/or tilt lens 104 (such that the lens is at an angle relative the XY-plane). Positioning equipment 106 may position lens 104 based on sensor information (e.g., information from gaze-tracker 62 and/or position and motion sensors 66). This sensor information may be used to determine a point of gaze of the user (e.g., the point to which the user is looking). Positioning equipment 106 may then move lens 104 such that the portion of the captured image that corresponds to the point of gaze of the user (e.g., the portion of the scene at which the user is looking) is directed to the high pixel density region 103B of the image sensor.

Figure 14:
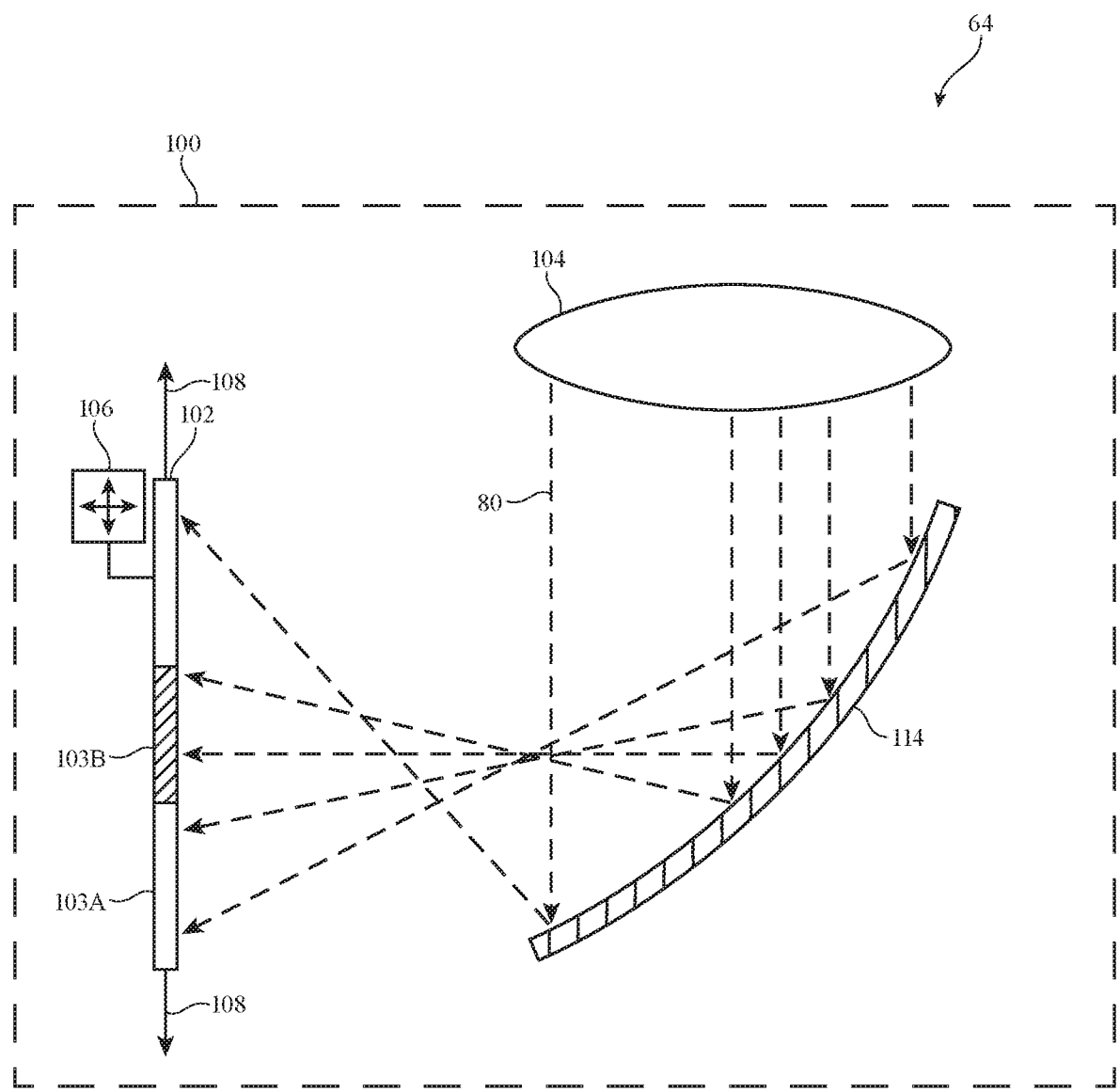
FIG. 14 is a cross-sectional side view of an illustrative camera module that includes a curved mirror and an image sensor with a varying pixel density that is positioned by positioning equipment in accordance with an embodiment.

In yet another embodiment, shown in FIG. 14, camera module 64 may include lens 104, mirror 114, and variable pixel density image sensor 102, similar to the embodiment of FIG. 10. In FIG. 10 mirror 114 is planar, whereas in FIG. 14, mirror 114 is curved. Lens 104 in FIG. 14 may be a low distortion lens. Image sensor 102 may be a variable pixel density image sensor with high pixel density portion 103B and low pixel density portion 103A to enable capture of high-resolution image data. The mirror 114 is positioned to direct the captured scene to the image sensor. A first portion of the captured scene is received and imaged by high pixel density portion 103B, and the remaining portions of the captured scene are received and imaged by low pixel density portion 103A. The image sensor therefore obtains high-resolution image data for a portion of the captured scene and low-resolution image data (with at least a lower resolution than the high-resolution image data) for the remaining portions of the captured scene. The curved mirror 114 may optionally magnify a portion of the image for an additional increase of resolution of the image data.

Camera module 64 may also include positioning equipment 106 for adjusting the position of image sensor 102. In particular, positioning equipment 106 may adjust the position of image sensor 102 to adjust which portion of the incoming light (e.g., which portion of the captured scene) is imaged by the high pixel density portion of the image sensor. Arrows 108 show how the image sensor may be shifted laterally (e.g., within the YZ-plane) by positioning equipment 106. Positioning equipment 106 may position image sensor 102 based on sensor information (e.g., information from gaze-tracker 62 and/or position and motion sensors 66). This sensor information may be used to determine a point of gaze of the user (e.g., the point to which the user is looking). Positioning equipment 106 may then move image sensor 102 such that high pixel density portion 103B of the image sensor receives light corresponding to the point of gaze of the user (e.g., the portion of the scene at which the user is looking).

Figure 15:
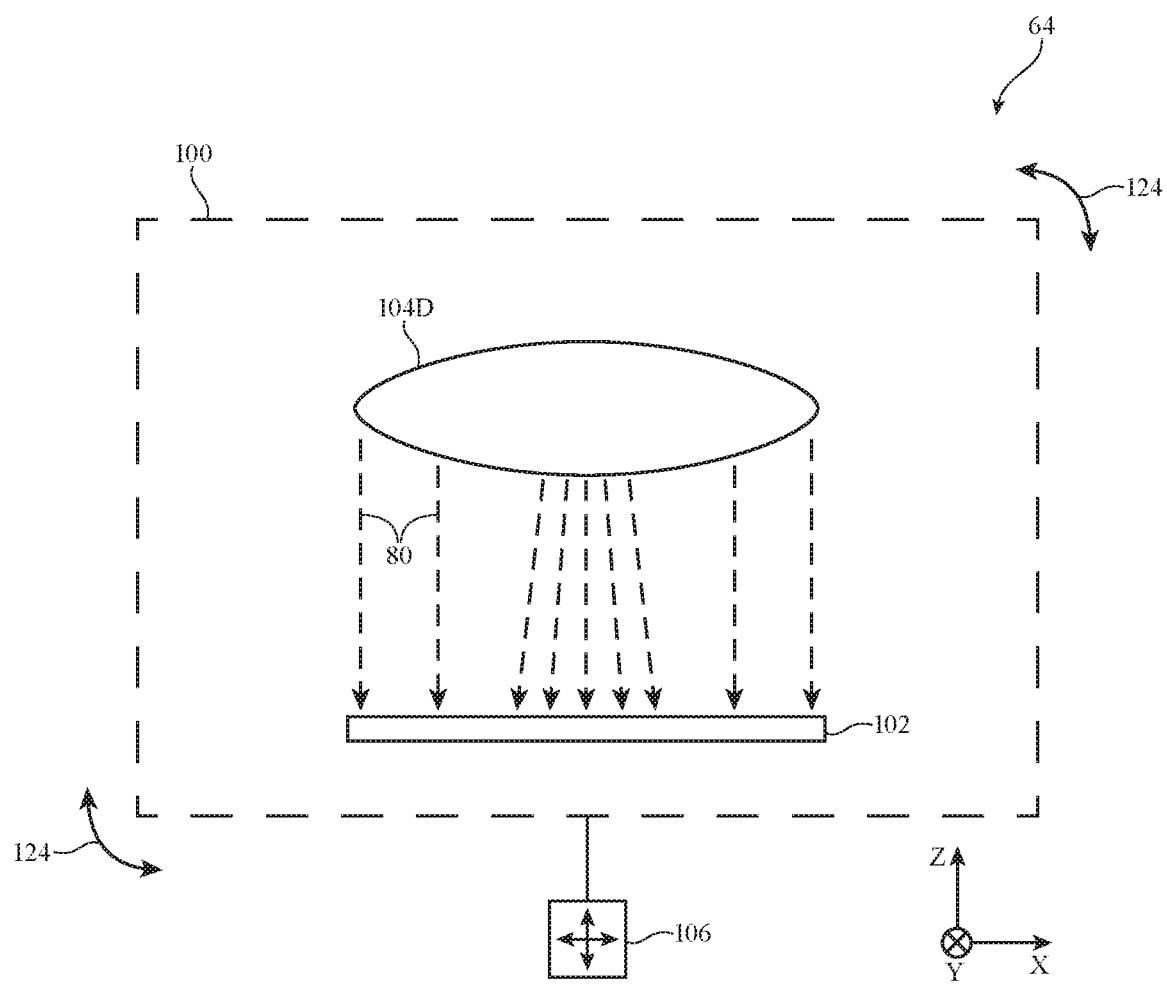
FIG. 15 is a cross-sectional side view of an illustrative camera module that includes an image sensor and a lens in a housing that is positioned by positioning equipment in accordance with an embodiment.

FIG. 15 shows yet another embodiment for camera module 64. In FIG. 15, camera module 64 includes a high distortion lens 104D that focuses light on image sensor 102. Housing 100 supports image sensor 102 and lens 104D. The image sensor is a fixed pixel density image sensor. Distortion lens 104D magnifies a portion of the captured scene so that high-resolution image data is obtained for the portion of the captured scene. In FIG. 6, positioning equipment 106 moved lens 104D to control which portion of the captured scene was magnified. In contrast, positioning equipment 106 in FIG. 15 changes the position of housing 100 (as shown by arrows 124 for example) to control which portion of the captured scene is magnified. Positioning equipment 106 can rotate or shift the position of housing 100 to change the direction lens 104D and image sensor 102 point. Positioning equipment 106 may position housing 100 based on sensor information (e.g., information from gaze-tracker 62 and/or position and motion sensors 66). This sensor information may be used to determine a point of gaze of the user (e.g., the point to which the user is looking). Positioning equipment 106 may then move housing 100 such that lens 104D magnifies incident light corresponding to the point of gaze of the user (e.g., the portion of the scene at which the user is looking).

The example in FIG. 15 of the movable housing being used with a stationary high distortion lens and a stationary fixed pixel density image sensor is merely illustrative. In general, any of the previous embodiments may include positioning equipment that can rotate or shift the position of housing 100. For example, a movable housing as shown in FIG. 15 may include a variable pixel density image sensor, a planar mirror, a curved mirror, a deformable mirror, and/or a low distortion lens, and the positions of any of these components may be adjusted by positioning equipment.

Figure 16:
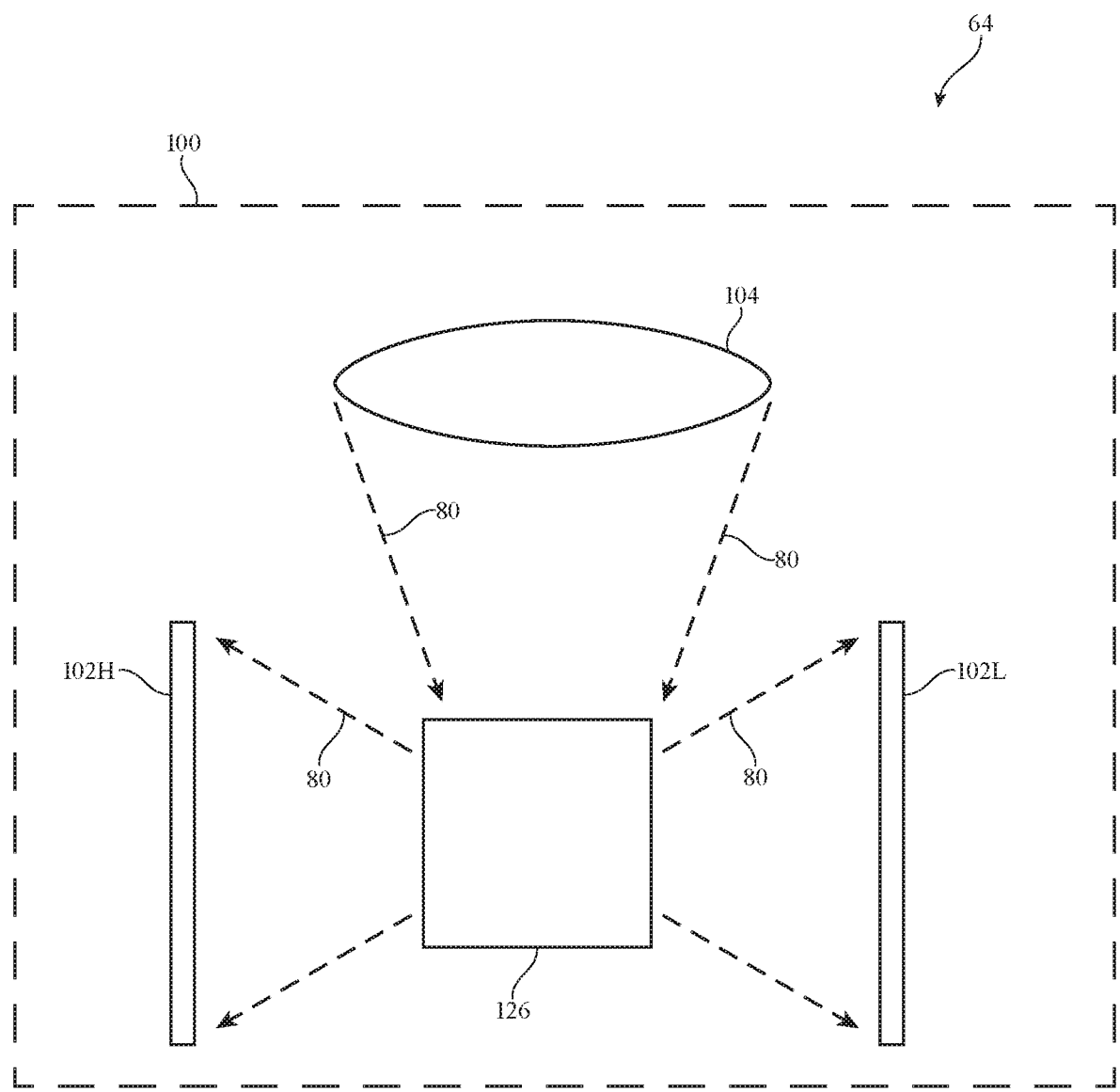
FIG. 16 is a cross-sectional side view of an illustrative camera module that includes a first image sensor for capturing high-resolution images, a second image sensor for capturing low-resolution images, and a beam-splitter in accordance with an embodiment.

In yet another embodiment, shown in FIG. 16, camera module 64 includes a beam splitter such as beam splitter 126. Beam splitter 126 (e.g., a prism) splits incoming light 80 onto two image sensors: image sensor 102H and image sensor 102L. Image sensor 102H may have a higher resolution (e.g., more pixels per inch) than image sensor 102L. Image sensor 102H may therefore sometimes be referred to as a high-resolution image sensor and image sensor 102L may sometimes be referred to as a low-resolution image sensor. Control circuitry in the head-mounted device (e.g., control circuitry 50 in FIG. 1) may dynamically select which portions of high-resolution image sensor 102H and/or low-resolution image sensor 102L to read out. The image data may then be combined to form a single image with high-resolution image data in desired portions and low-resolution image data in the remaining portions. Control circuitry 50 may select which portions of each sensor to read out based on sensor information (e.g., information from gaze-tracker 62 and/or position and motion sensors 66) such as point of gaze information.

Figure 17:
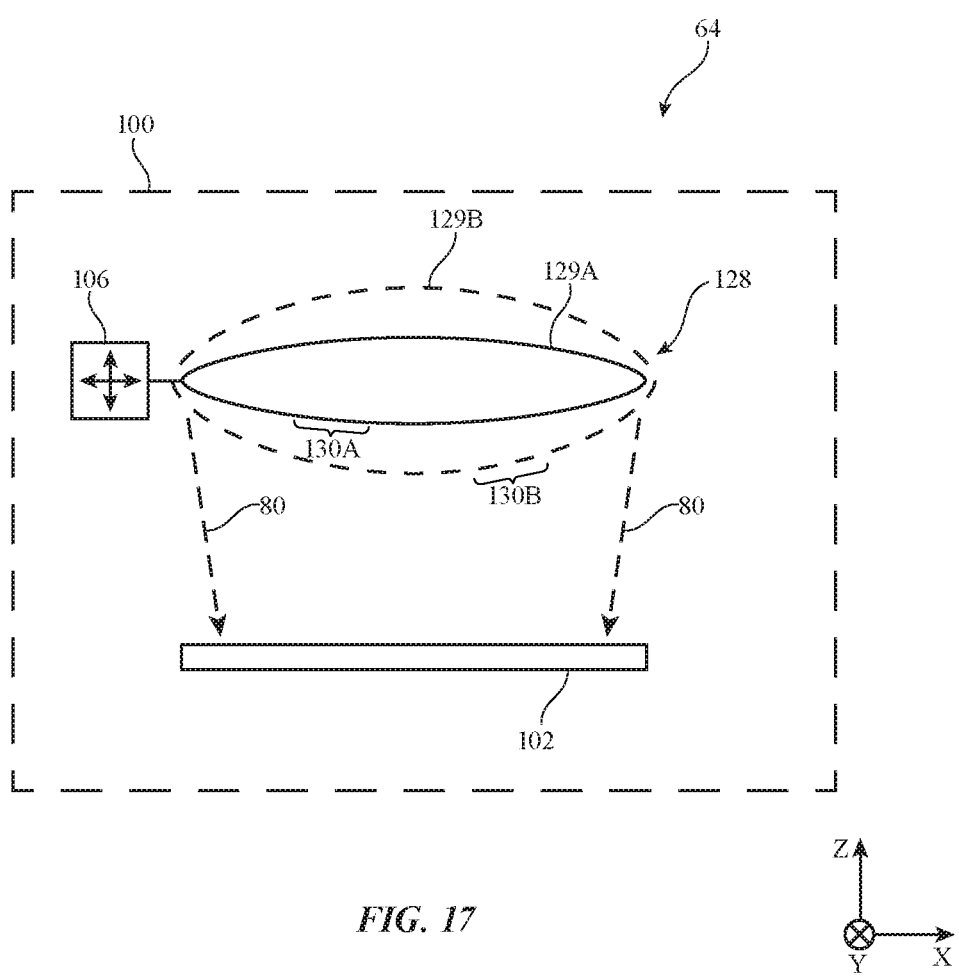
FIG. 17 is a cross-sectional side view of an illustrative camera module that includes an image sensor and a lens that may change shape to control how light is directed to the image sensor in accordance with an embodiment.

FIG. 17 shows another embodiment for camera module 64. In FIG. 17, the camera module includes a deformable lens. As shown in FIG. 17, image sensor 102 and lens 128 are formed in housing 100 of camera module 64. Lens 128 is a deformable lens (sometimes referred to as a shape-changing lens or adaptable lens). Lens 128 may be controlled (e.g., by equipment 106) to take a desired shape. For example, lens 128 may change between a first shape 129A and a second shape 129B. The different shapes of lens 128 may each have a different profile of angular resolution while maintaining the same focus. This way, the captured scene may be focused onto image sensor 102 (regardless of the shape of the lens). However, the different shapes of the deformable lens may allow different portions of the captured scene to be magnified (for high-resolution image data). For example, when the lens has shape 129A a portion 130A of the lens may magnify a first portion of the incoming light (e.g., increase the angular resolution of the light relative to surrounding lens portions). When the lens has shape 129B a portion 130B of the lens (that is different than portion 130A) may magnify a second, different portion of the incoming light. In this way, the shape of the lens may be controlled to select a portion of the incoming light to optically stretch. Therefore, the shape of the lens may be controlled to obtain high-resolution image data of a selected portion of the captured scene. The lens may be changed between any desired number of shapes (e.g., two, three, four, more than four, more than ten, less than twenty, etc.), with each shape having an associated resolution of image data obtained by image sensor 102.

Lens 128 may be formed in any desired manner that allows the lens to change shape. For example, the lens may be a liquid lens that changes shape based on liquid volume. The lens may be a liquid crystal lens that changes shape based on a voltage. The lens may include microelectromechanical systems (MEMS) if desired.

Figure 18:
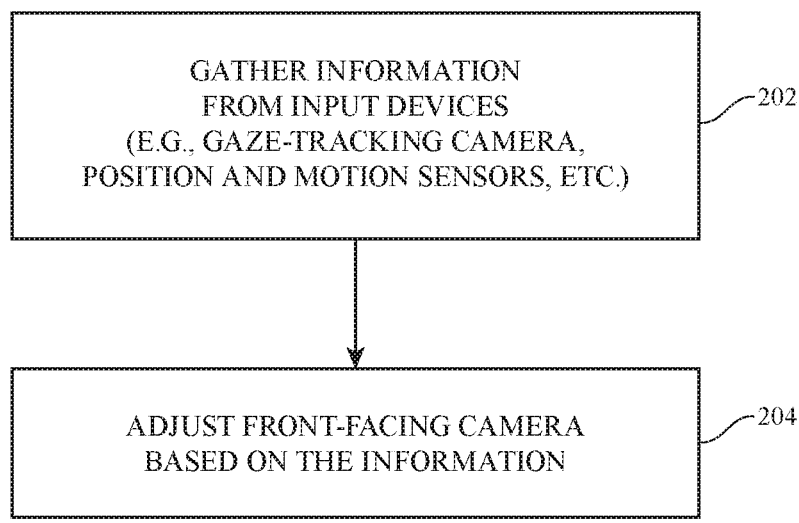
FIG. 18 is a flow chart of illustrative operations involved in operating a head-mounted device with a gaze-tracking system and a front-facing camera in accordance with an embodiment.

FIG. 18 is a flowchart of illustrative method steps that may be performed during operations of a head-mounted device such as head-mounted device 10 in FIG. 1. As shown in FIG. 18, at step 202 control circuitry (e.g., control circuitry 50 in FIG. 1) may gather information from input devices in the head-mounted device. Control circuitry 50 may gather information from any desired input devices. For example, control circuitry 50 may gather information from gaze-tracking camera 62, position and motion sensors 66, or any other desired input devices. The information gathered at step 202 may include point of gaze information (e.g., information indicating where the user is looking).

Next, at step 204, control circuitry 50 may adjust front-facing camera 64 based on the information obtained during step 202 (e.g., the point of gaze information). The control circuitry may adjust the front-facing camera in any desired manner (e.g., by adjusting the position of a lens, the shape of a lens, the position of a mirror, the shape of a mirror, the position of an image sensor, or the position of a camera module housing). The control circuitry may adjust the front-facing camera such that the front-facing camera obtains high-resolution image data for a portion of the scene that corresponds to the point of gaze of the user and low-resolution image data for portions of the scene that correspond to the periphery of the user's field of view. After the front-facing camera is adjusted, the front-facing camera may capture image data that is then displayed on display 26 of the head-mounted device.

The foregoing is merely illustrative and various modifications can be made to the described embodiments. The foregoing embodiments may be implemented individually or in any combination.

What is claimed is:

1. A head-mounted device, comprising:
a head-mounted support structure;
a pass-through camera that is supported by the head-mounted support structure and that is configured to capture an image of a real-world scene, wherein the image has a first-resolution portion and a second-resolution portion that has a higher resolution than the first-resolution portion;
a display that is supported by the head-mounted support structure and that is configured to display the image;
a gaze-tracking system that is configured to obtain point of gaze information; and
control circuitry that is configured to adjust a lens in the pass-through camera based on the point of gaze information, wherein the lens outputs light with varying angular resolution and wherein adjusting the lens adjusts which portion of the real-world scene corresponds to the second-resolution portion of the image.

2. The head-mounted device defined in claim 1, wherein the pass-through camera comprises an image sensor that is configured to capture the image.

3. The head-mounted device defined in claim 2, wherein the lens is configured spread light incident in a first portion of the lens across a greater corresponding area of the image sensor than light incident in a second portion of the lens.

4. The head-mounted device defined in claim 2, wherein the lens is configured spread light incident in a center of the lens across a greater corresponding area of the image sensor than light incident in a periphery of the lens.

5. The head-mounted device defined in claim 1, wherein the lens increases an angular resolution of a portion of incident light from the real-world scene that corresponds to the second-resolution portion of the image.

6. A head-mounted device, comprising:
a head-mounted support structure;
a display that is supported by the head-mounted support structure and that is configured to display an image;
a gaze-tracking system that is configured to obtain point of gaze information; and
a camera module comprising:
an image sensor that is configured to capture the image based on incident light from real-world objects; and
a lens that magnifies some but not all of the incident light onto the image sensor, wherein the lens is configured to be adjusted based on the point of gaze information.

7. The head-mounted device defined in claim 6, wherein light in a first area of the lens is spread onto a second area of the image sensor and wherein the second area is greater than the first area.

8. The head-mounted device defined in claim 6, wherein the image has a first-resolution portion and a second-resolution portion having a higher resolution than the first-resolution portion and wherein the incident light magnified by the lens corresponds to the second-resolution portion of the image.

9. A head-mounted device, comprising:
a head-mounted support structure;
an outward-facing camera that is supported by the head-mounted support structure and that is configured to use an image sensor to capture an image of a real-world scene, wherein the image has a first-resolution portion and a second-resolution portion that has a higher resolution than the first-resolution portion;
a gaze-tracking system that is supported by the head-mounted support structure and that includes an inward-facing camera, wherein the gaze-tracking system is configured to obtain point of gaze information based on images captured by the inward-facing camera;
a display that is supported by the head-mounted support structure and that is configured to display the image of the real-world scene; and
control circuitry that is configured to adjust which portion of the real-world scene corresponds to the second-resolution portion of the image based on the point of gaze information.

10. The head-mounted device defined in claim 9, wherein the control circuitry is configured to physically move a component in the outward-facing camera to adjust which portion of the real-world scene corresponds to the second-resolution portion of the image.

11. The head-mounted device defined in claim 10, wherein the component comprises a component selected from the group consisting of: an image sensor, a mirror, a lens, and a camera module housing.

12. The head-mounted device defined in claim 10, wherein the component is a distortion lens that magnifies incident light from a first portion of the real-world scene that corresponds to the first-resolution portion of the image less than incident light from a second portion of the real-world scene that corresponds to the second-resolution portion of the image.

\* \* \* \* \*